`United States Patent` [19]

Garcia et al.

[11] Patent Number: 6,163,834
[45] Date of Patent: Dec. 19, 2000

[54] TWO LEVEL ADDRESS TRANSLATION AND MEMORY REGISTRATION SYSTEM AND METHOD

[75] Inventors: David J. Garcia, Los Gatos, Calif.; Daniel L. Fowler, Georgetown, Tex.

[73] Assignee: Tandem Computers Incorporated, Cupertino, Calif.

[21] Appl. No.: 09/228,069

[22] Filed: Dec. 30, 1998

Related U.S. Application Data

[60] Provisional application No. 60/070,650, Jan. 7, 1998.

[51] Int. Cl.[7] .................................................. G06F 12/10
[52] U.S. Cl. .......................................................... 711/206
[58] Field of Search ............................................. 711/206

[56] References Cited

U.S. PATENT DOCUMENTS

| 4,733,350 | 3/1988 | Tone et al. . |
| 5,386,524 | 1/1995 | Lary et al. ............................. 395/400 |
| 5,555,405 | 9/1996 | Griesmer et al. ..................... 395/600 |
| 5,619,274 | 4/1997 | Roop et al. . |
| 5,920,886 | 7/1999 | Feldmeier . |

FOREIGN PATENT DOCUMENTS 0 757 318 A2    2/1997    European Pat. Off. ........ G06F 13/12

OTHER PUBLICATIONS

Garcia et al., "Servernet II" *Parallel Computer Routing and Communication*,(2nd Int. WKSP), Jun.26,1997, pp.119–135, XP002103164, Atlanta, GA.

Eicken Von T. et al., "U–Net: A User–Level Network Interface for Parallel and Distributed Computing, " *Operating Systems Review* (SIGOPS), vol. 29, No. 5.Dec. 1, 1995, pp. 40–53.

Dunning D. et al., "The Virtual Interface Architecture," *IEEE Micro*, vol.18, No.2, Mar. 1998, pp. 66–76.

Primary Examiner—Jack A. Lane
Attorney, Agent, or Firm—Townsend and Townsend and Crew LLP

[57]    ABSTRACT

A two-level memory region registration and address translation method includes a memory handle table and a translation and protection table (TPT). Each memory region registered is associated with a unique memory handle index which accesses one entry of the memory handle table. The accessed entry in the memory handle table stores a memory handle that is combined with virtual addresses in the registered memory region to access TPT entries storing translation data for the virtual addresses in the registered memory region.

4 Claims, 8 Drawing Sheets

MEMORY HANDLE TABLE ENTRY FORMAT (8 BYTES)

TPT Start - Beginning Address (4K byte pointer) to start of TPT entries
TPT Ext[9:0] - TPT Extent. The number of consecutive 4K byte pages of TPT entries for this TPT block. A value of 0 indicaaates an invalid entry.
MH - Memory Handle
P - Page Size Indication. Use large size (VCS.LPS) else use small size (VCS.SPS) Affects VA bits used in PPA calculation (not shown) 1 bit

TPT ENTRY FORMAT (8 BYTE)

PPN- Physical page number
V - Valid. If clear then protection check fails; 1 bit
RDMAWrt - RDMA Write Permission; 1 bit
RDMARead - RDMA Read Permission; 1 bit
PPTWrt - Processor Page Table Write Permission; 1 bit (should always be set in CO2)
Tag - Owner ID protection check field

TWO LEVEL ADDRESS TRANSLATION AND MEMORY REGISTRATION SYSTEM AND METHOD

CROSS-REFERENCES TO RELATED APPLICATIONS

This application claims priority from Provisional Application Ser. No. 60/070,650, filed Jan. 7, 1998, the disclosure of which is incorporated herein by reference.

BACKGROUND OF THE INVENTION

The virtual interface architecture (VIA) has been jointly developed by a number of computer and software companies. VIA provides consumer processes with a protected, directly accessible interface to network hardware, termed a virtual interface. VIA is especially designed to provide low latency message communication over a system area network (SAN) to facilitate multi-processing utilizing clusters of processors.

A SAN is used to interconnect nodes within a distributed computer system, such as a cluster. The SAN is a type of network that provides high bandwidth, low latency communication with a very low error rate. SANs often utilize fault-tolerant technology to assure high availability. The performance of a SAN resembles a memory subsystem more than a traditional local area network (LAN).

Figure 1:
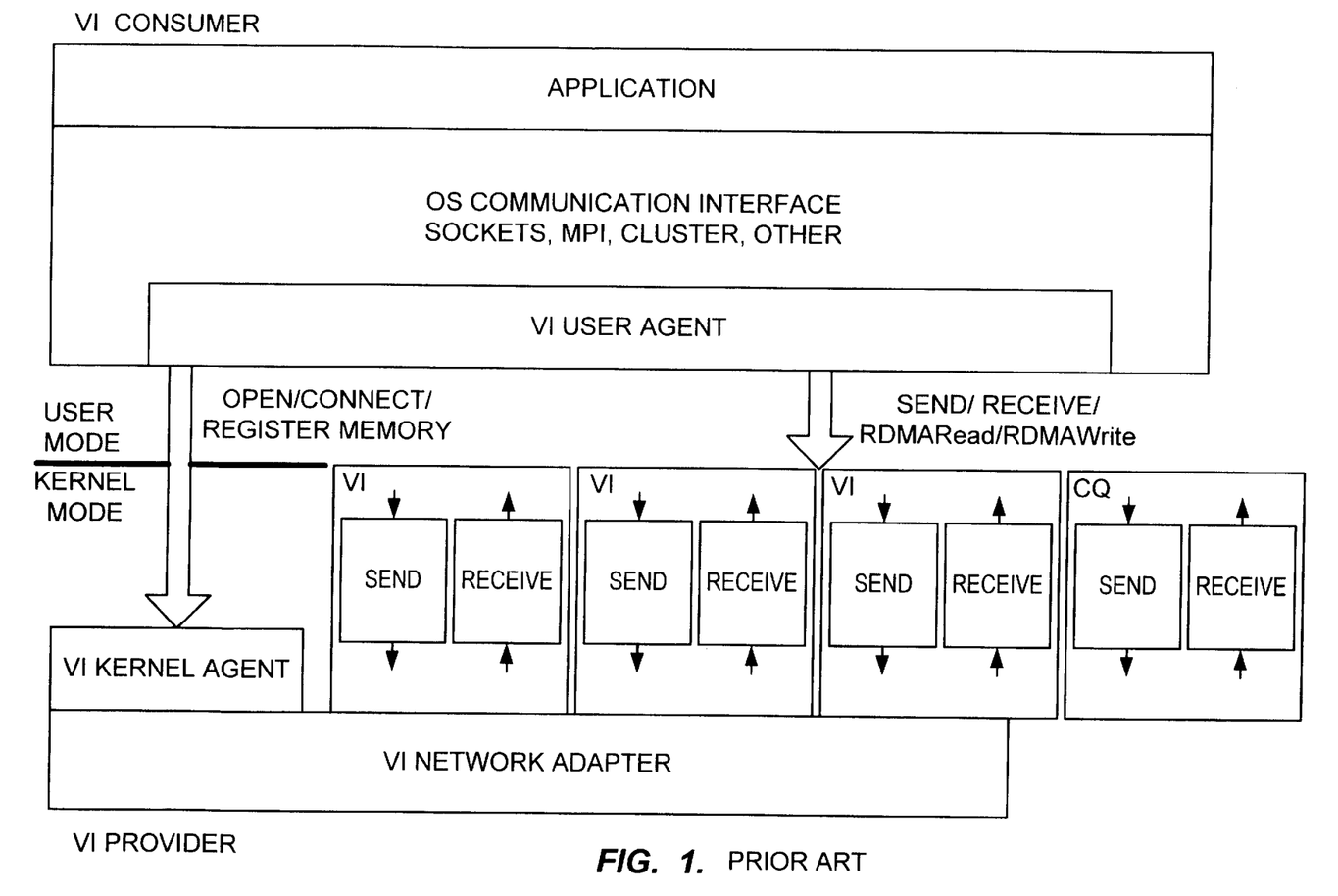
FIG. 1 is a block diagram of the Virtual Interface Architecture (VIA)

The VIA is described in the Virtual Interface Architecture Specification, Draft Revision 1.0, Dec. 4, 1997. The VI Architecture is comprised of four basic components: Virtual Interfaces, Completion Queues, VI Providers, and VI Consumers. The VI Provider is composed of a physical network adapter and a software Kernel Agent. The VI Consumer is generally composed of an application program and an operating system communication facility. The organization of these components is illustrated in FIG. 1.

Figure 2:
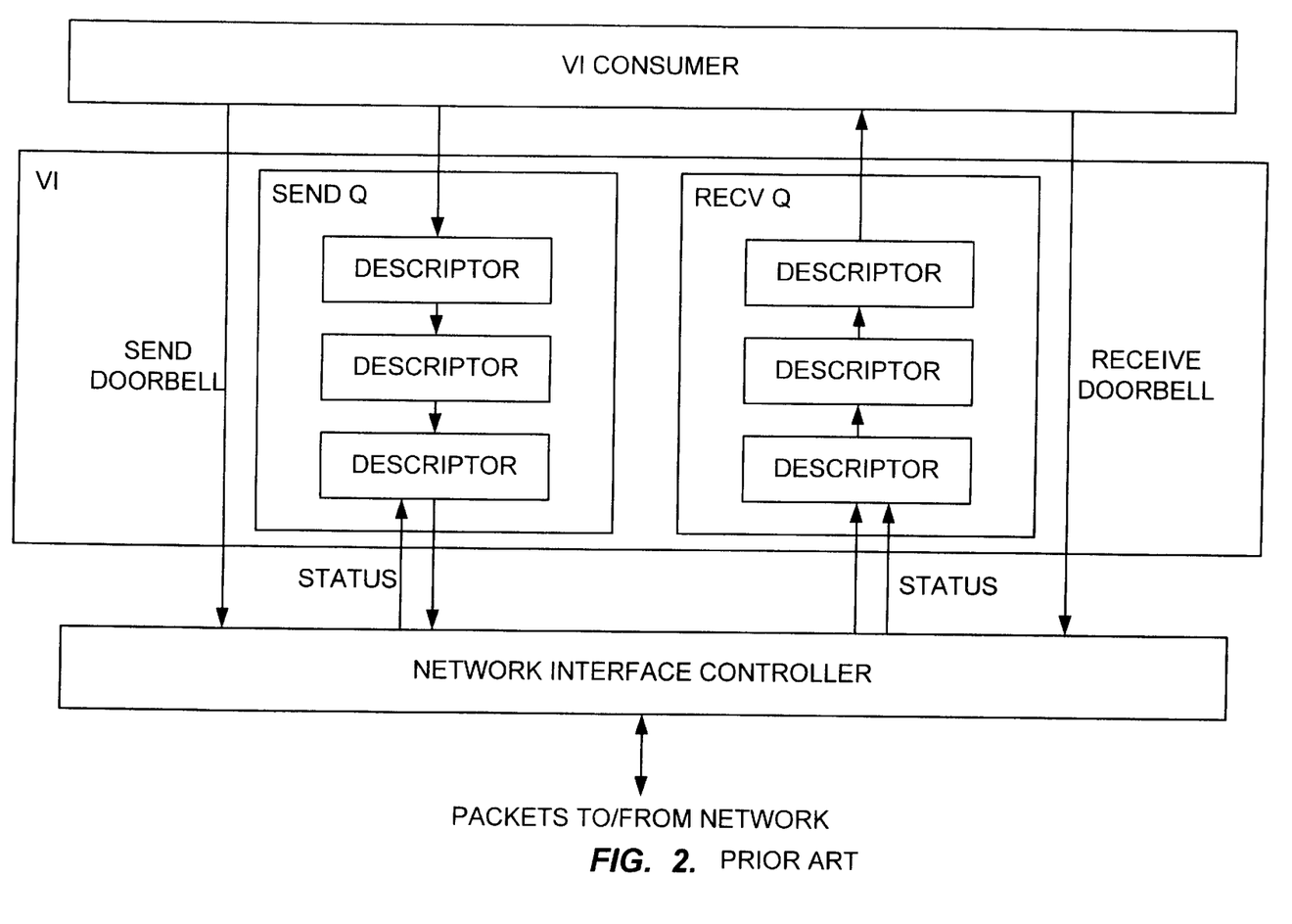
FIG. 2 is a block diagram of a Virtual Interface (VI)

A VI is depicted in FIG. 2 and consists of a pair of Work Queues: a send queue and a receive queue. VI Consumers post requests, in the form of Descriptors, on the Work Queues to send or receive data. A Descriptor is a memory structure that contains all of the information that the VI Provider needs to process the request, such as pointers to data buffers.

The VI Provider is the set of hardware and software components responsible for instantiating a Virtual Interface. The VI Provider consists of a network interface controller (NIC) and a Kernel Agent (KA).

The VI NIC implements the Virtual Interfaces and directly performs data transfer functions. The NIC provides an electromechanical attachment of a computer to a network. Under program control, a NIC copies data from memory to the network medium, i.e., transmission, and from the medium to the memory, i.e., reception.

The Kernel Agent is a privileged part of the operating system, usually a driver supplied by the VI NIC vendor, that performs the setup and resource management functions needed to maintain a Virtual Interface between VI Consumers and VI NICs. These functions include the creation/destruction of VIs, VI connection setup/teardown, interrupt management and/or processing, management of system memory used by the VI NIC, and error handling. VI Consumers access the Kernel Agent using standard operating system mechanisms such as system calls. Kernel Agents interact with VI NICs through standard operating system device management mechanisms.

The VI Architecture requires the VI Consumer to identify memory used for a data transfer prior to submitting the request. Only memory that has been registered with the VI Provider can be used for data transfers. This memory registration process allows the VI Consumer to reuse registered memory buffers, thereby avoiding duplication of locking and translation operations. Memory registration also takes this processing overhead out of the performance-critical data transfer path.

Memory registration enables the VI Provider to transfer data directly between the buffers of a VI Consumer and the network without copying any data to or from intermediate buffers.

Memory registration consists of locking the pages of a virtually contiguous memory region into physical memory and providing the virtual to physical translations to the VI NIC. The VI Consumer gets an opaque handle for each memory region registered. The VI Consumer can reference all registered memory by its virtual address and its associated handle.

Memory is registered with the VI NIC for two reasons:
1) to allow the NIC to perform virtual to physical address translation
2) to allow the NIC to perform protection checking.

Figure 3:
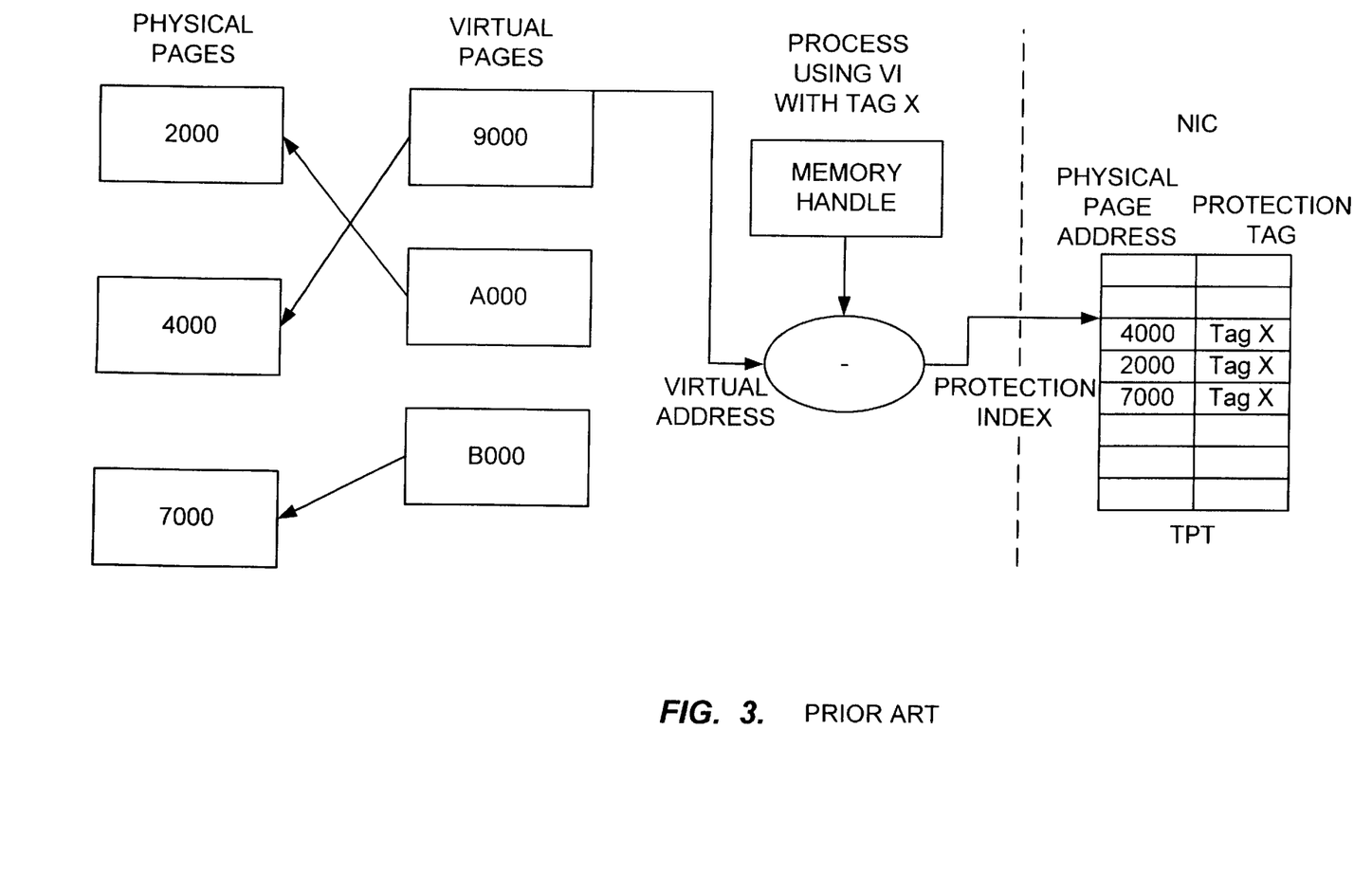
FIG. 3 is a block diagram of the VIA address translation scheme.

Consumers are able to use virtual addresses to refer to VI Descriptors and communication buffers. The VI NIC is able to translate from virtual to physical addresses through the use of its Translation and Protection Table (TPT). The TPT of the NIC described in the VIA Specification resides on the NIC in order to assure fast, noncontentious access and because it is accessed during performance critical data movement. A TPT and method of accessing the TPT are depicted in FIG. 3. The fields of each TPT entry are:
 a) a valid indication bit
 b) a physical page address
 c) a protection tag
 d) an RDMA Write Enable Bit
 e) an RDMA Read Enable Bit
 f) a Memory Write Enable Bit The size of the TPT is configurable. There is one entry in the TPT for each page that can be registered by the user. A memory region of N contiguous virtual pages consumes N contiguous entries in the TPT.

When a memory region is registered with the NIC, the Kernel Agent allocates a contiguous set of entries from the TPT and initializes them with the corresponding physical page addresses and protection tag specified by the process that registered the memory region. The protection tag specified by the process when it creates a VI is stored in the context memory of the VI. The NIC has access to the protection tag in both of these areas, allowing it to compare these values to detect invalid accesses. Page sizes larger than 4 KB are supported and page size may differ among nodes of the SAN.

The above-described implementation of the TPT has several disadvantages. If TPT entries are allowed to exist anywhere in memory, an application could set-up bogus TPT entries which point to any physical address. A RDMA Write descriptor could then be set up, given appropriate Virtual Address and Memory Handle to use this bogus TPT entry and scribble anywhere in memory. The standard solution is to limit the locations of legal TPT entries. The requirement of allocation of contiguous memory to facilitate bounds checking consumes a large amount of memory. Another problem resulting from the standard solution is that it may lead to fragmentation of entries in the TPT which can result in a failure when attempting to find multiple consecutive entries required when registering large memory regions.

Figure 4:
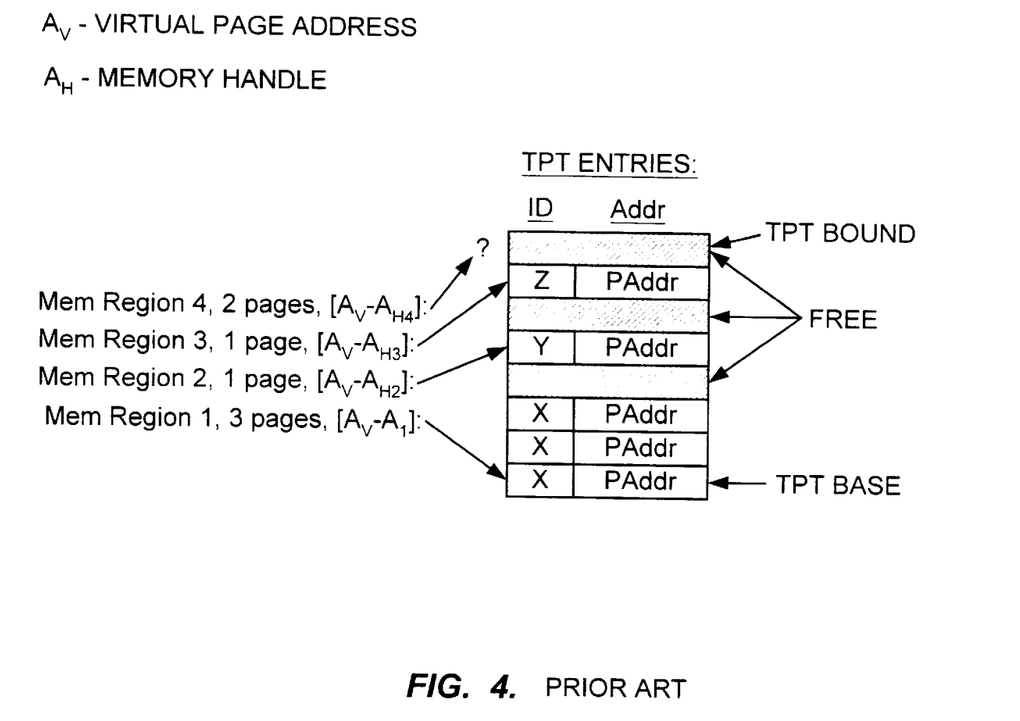
FIG. 4 is a block diagram depicting a fragmented TPT.

The fragmentation problem is illustrated in FIG. 4 which depicts an exaggerated example where the TPT range is limited to only eight entries. There are three active registered memory regions, with TPT owner IDs X, Y, and Z, which differentiate the registered memory regions. An application cannot register a new two page memory region, Mem Region 4, because, due to previous fragmentation of the TPT, no two TPT entries are contiguous. Thus, Mem Region 4 cannot be registered even though there are three available entries in the TPT.

If the Memory Handles could be reassigned, then larger contiguous sets of free locations could be found. Unfortunately, this is not possible because the Memory Handles returned to the applications earlier are already in use in descriptors and it would be undesirable to stop VI processing and update all the descriptors.

SUMMARY OF THE INVENTION

According to one aspect of the invention, a two-level look-up scheme utilizes a Memory Handle Index to obtain an index into a table of Memory Handles, the Memory Handle Table (MHT), used for accessing the TPT.

According to another aspect of the invention, an application receives a Memory Handle Index when it registers memory. The TPT entries for the registered area of memory can be moved and the Memory Handles reassigned without requiring the descriptors, which use the Memory Handle Index, to be updated.

According to another aspect of the invention, the TPT can be stored in any place in memory and fields for base/bounds checking are included in each MHT entry.

According to another aspect of the invention, the TPT can be defragmented by moving fragmented entries to free locations and updating the Memory Handle to point to the new location. Since descriptors in use hold Memory Handle Indices, the descriptors do not need to be updated.

Other features and advantages of the invention will be apparent in view of the following detailed description and appended drawings.

DESCRIPTION OF THE SPECIFIC EMBODIMENTS

Figure 5:
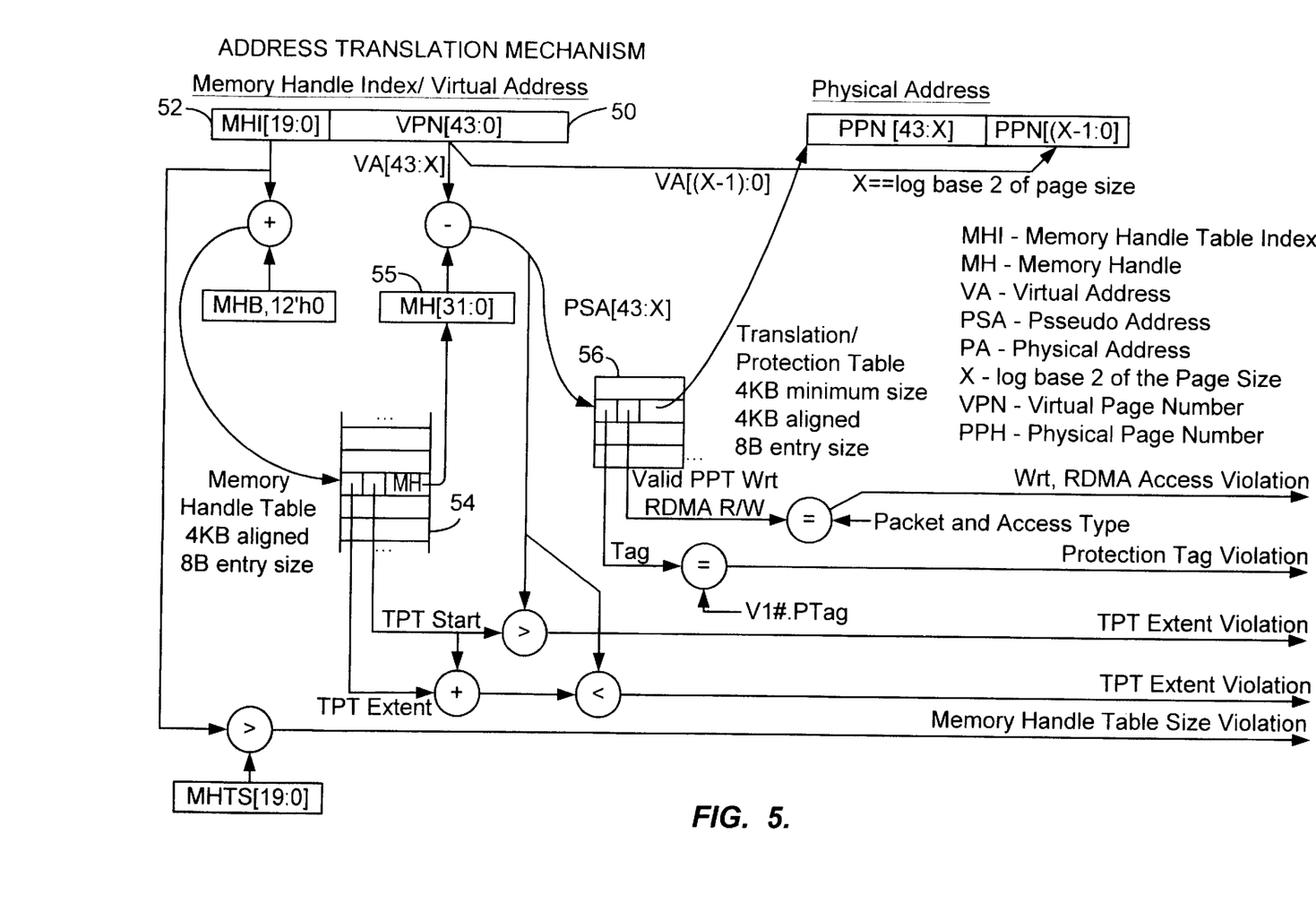
FIG. 5 is a schematic diagram of a preferred embodiment of the two-level address translation mechanism.

A preferred embodiment of the invention will now be described with reference to FIG. 5 which depicts a novel two-level scheme for accessing a translation protection table (TPT) implemented by the network interface card (NIC) and kernel agent (KA) of the VI consumer as depicted in FIG. 1.

Applications access memory using virtual addresses 50 and Memory Handle Indices (MHI) 52. The NIC provides the translation to physical addresses. The MI value 52 is returned from the VI User Agent during memory registration.

The MHI 52 is an offset into a first level table called the Memory Handle Table 54. This first level table contains the Memory Handles (MH) 55. The MH is subtracted from the Virtual Page Number (VPN) 50 to generate a pointer into the second level Translation and Protection Table (TPT) 56. This pointer is called the Pseudo Address (PSA). Note that in the VIA Specification and FIG. 3 this pointer is denoted the "protection index". The TPT holds the Physical Page Number (PPN). The MHI is 20 bits, allowing for up to IM Memory Handles. The present embodiment requires the Memory Handle Table to reside in physically contiguous memory which begins at the Memory Handle Base register value.

Each Memory Handle Table entry is 8 bytes. The Memory Handle is 32 bits allowing 4G TPT Entries. Each TPT entry is 8 bytes. Protection checks which limit the start and extent of TPT entries force them to begin in the lower 8 GBytes of memory because of the size of the TPT Start field in the present embodiment.

The VIA Specification uses terminology which is different from that used with the presently described NIC regarding the Memory Handle, since the VIA Specification describes only a one table lookup implementation whereas the present NIC uses a 2 table lookup implementation for calculating physical addresses. Both the implementation described in the VIA specification and the preferred embodiments subtract the Memory Handle from the virtual address to obtain the pseudo-address (PSA).

But the NIC of the preferred embodiment does not get the Memory Handle from the descriptor, it gets the memory handle from the 1st level MHI table 54 which is pointed to by the Memory Handle index 52 which is gotten from the descriptor. Therefore, in the preferred embodiment, the Memory Handle Index 52 is returned by the VI User Agent RegisterMem call, but in VIA VI User Agent terms the Memory Handle is returned by the VI User Agent RegisterMem call. As noted, the Memory Handle Index (MHI) and Memory Handle (MH) are not the same even though the VIA implementation and the preferred embodiment describe the same VI User Agent call (RegisterMem) as returning the value the implementation needs.

Figure 6:
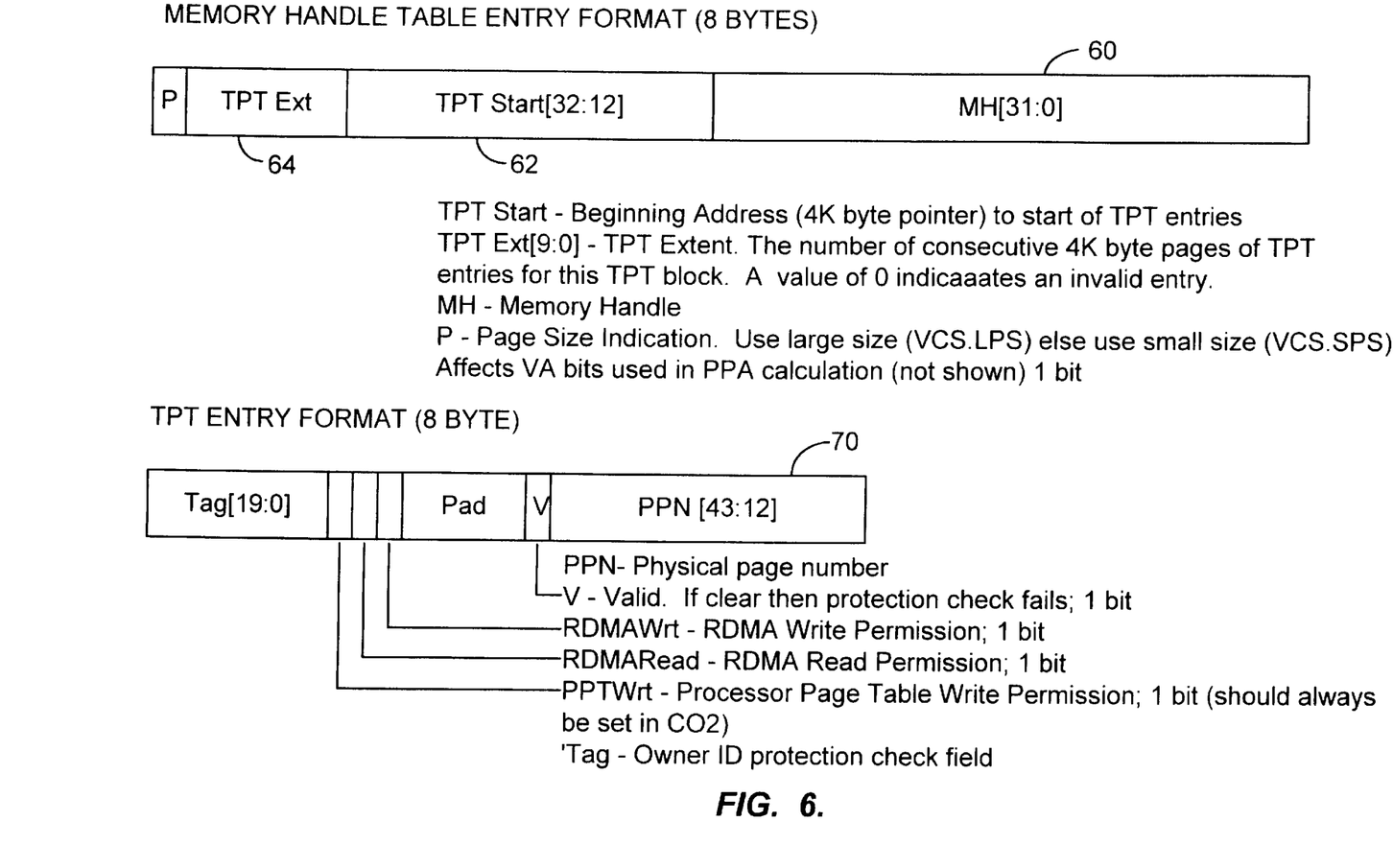
FIG. 6 is a block diagram of the MHT entry format and the TPT entry format.

FIG. 6 depicts the Memory Handle Table entry format 60 and TPT entry format 70. The TPT Start field 62 is a 4K byte physical address pointer to the beginning of the block of TPT entries allocated as part of the memory registration. This field is 21 bits in width, requiring TPT entries to start in within the lower 8 G bytes of memory. The TPT Extent field 64 indicates how many 4K byte pages of TPT entries are valid for this registration. Each page can hold 512 TPT entries. The TPT Extent field is 10 bits in width, allowing up to 1023 pages, each page containing 512 TPT entries. Therefore, the maximum memory a single memory registration can handle is 1023×512×Pegasus. For a Pegasus of 4 Kbytes, this is 2 G bytes–2M bytes.

All Memory Handle table entries must be appropriately programmed by the Kernel Agent. Any unused entry must have its TPT Extent field set to all zeros. The second level TPT Entries indicated by the TPT Start, TPT Extent pair must also be programmed by the Kernel Agent. Unused entries must have their valid bits (V) cleared, this includes unused entries beyond those used for the memory registration, but within the same 4K byte page as the last valid entry.

Referring back to FIG. 5, the use of the TPT start and Extent fields to implement base/bound checking will now be described. The Pseudo-Address (PSA) is a pointer into the TPT. The magnitude of the PSA generated for a particular Memory Handle is compared to the TPT start field and the sum of the TPT Start and Extent fields (which sum gives the bound of the TPT). If the generated PSA is less than TPT start or greater than the sum of TPT Start and Extent than a TPT Extent Violation is signaled.

The use of the two level-level accessing scheme to rearrange TPT entries to eliminate fragmentation will now be described with reference to FIG. 4, 7, and 8A–8C. As previously described, a new region of memory must be registered utilizing contiguous entries in the TPT. FIG. 4 depicts a TPT having three unused entries, but due to previous assignment of Memory Handles, no two entries are contiguous and a new memory region of two pages cannot be registered.

Figure 7:
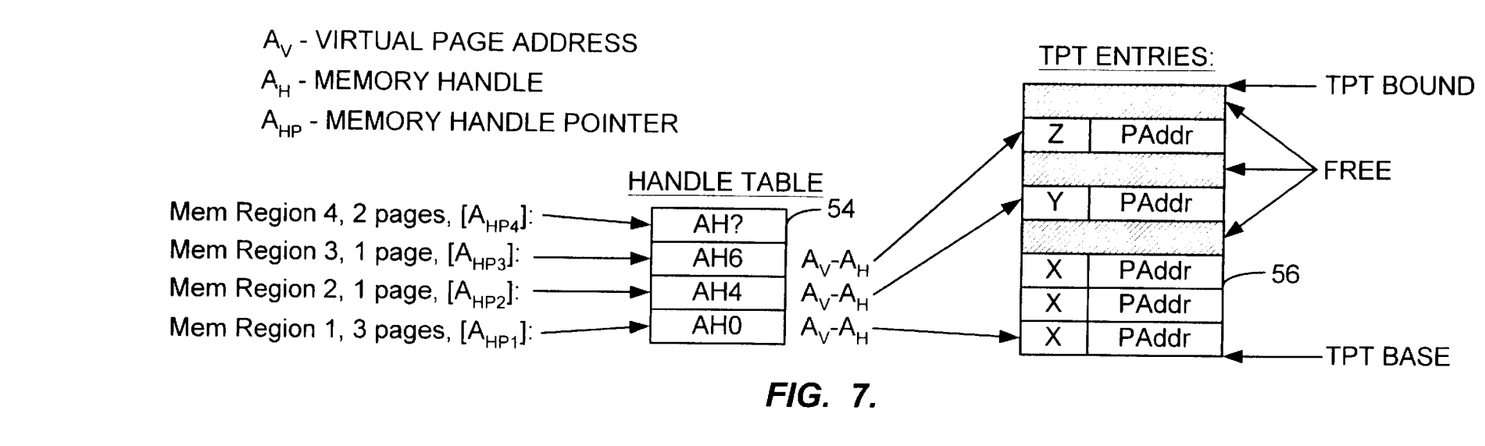
FIG. 7 is a block diagram of a fragmented TPT utilizing the two level lookup table scheme.

FIG. 7 depicts the same memory regions and TPT entries of FIG. 1, but which utilize the two-level table look-up scheme described above. Thus, a MHI, $A_{HP1}$ to $A_{HP3}$, has been returned for each memory region registered. Each of these MHIs obtains an MH from the MH table 54, which, when combined with the Virtual Address provided by an application, form a PSA ($A_V$–$A_H$) that accesses the correct entry in the TPT.

Figure 8A:
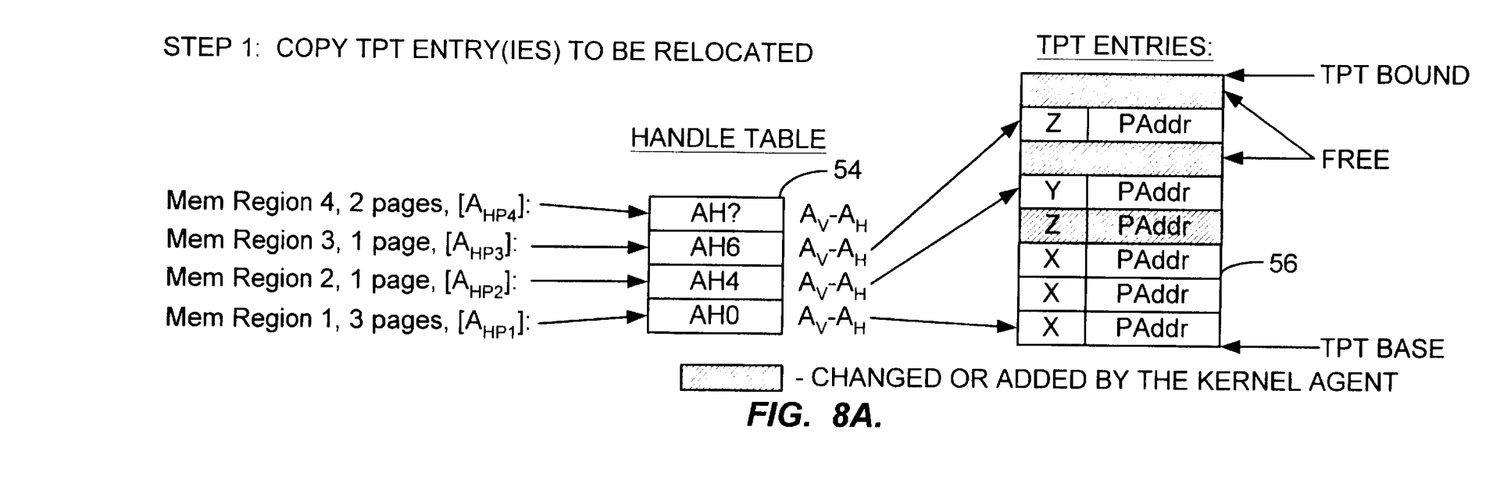
FIGS. 8A–8C depict the steps of defragmenting the TPT.

The defragmentation of the TPT to provide contiguous entries will now be described with reference to FIGS. 8A–8C. In Step 1, FIG. 8A, is to copy the TPT entry(ies) to be relocated. In this case the entry from entry[6] is copied to entry[3].

Figure 8B:
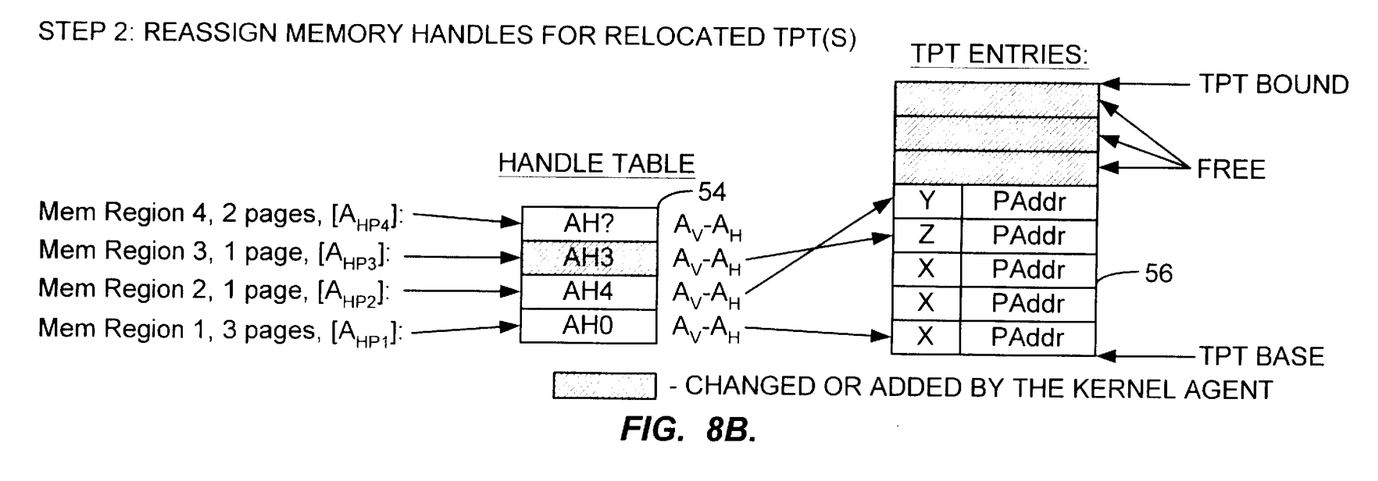
Figure 8C:
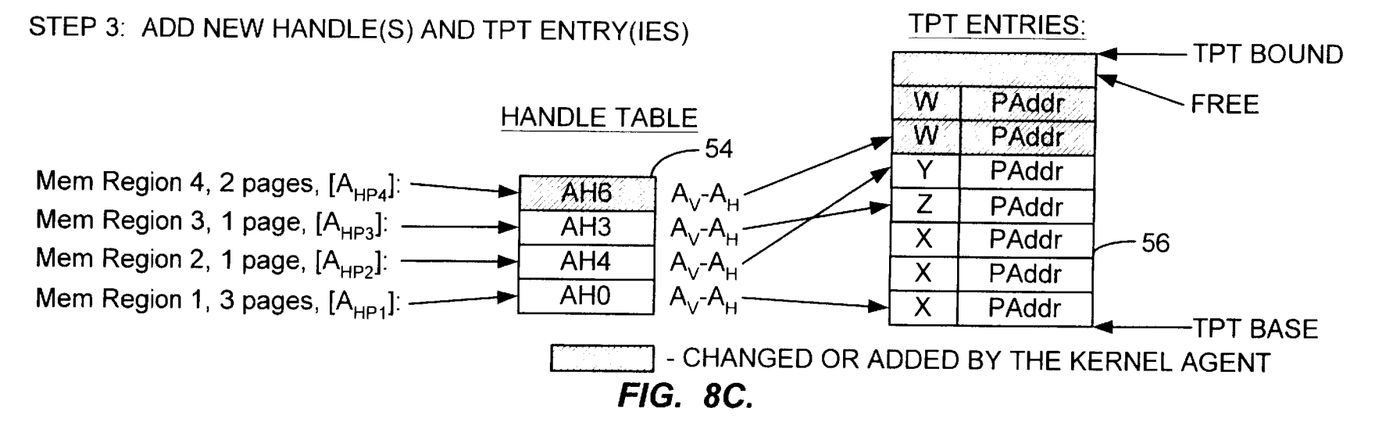

Next, in Step 2, FIG. 8B, the Memory Handles for the relocated TPT entry(ies) are reassigned. In this case, the MH that previously formed a PSA pointing to entry[6] is changed to an MH that forms a PSA pointing to entry[3]. Note that the reassigned MH is still located in the same entry in the Memory Handle table so the MHI indexes the correct MH to access the correct translation data. Thus, the entries in the TPT can be moved without having to update the descriptors.

Finally, in Step 3, a new handle, $AH_6$, is added which forms a PSA pointing to entry[5] and the translation data for Mem Region 4 is stored in entry[5] and entry[6] of the TPT. The MHI $A_{HP4}$ is returned to the application registering Mem Region 4.

In the preferred embodiment, the KA copies the Mem Region 3 data to the new TPT entry and the changes the data in the Memory Handle table to access the newly copied entry. This freed up three consecutive TPT entry locations which can then be used for the newly registered Mem Region 4.

The invention has now been described with reference to the preferred embodiments. Alternatives and substitutions will now be apparent to persons of skill in art. For example, the particular size of the fields described are not critical to the invention. In addition, different algorithms for combining a Memory Handle and virtual address could be utilized. Accordingly, it is not intended to limit the invention except as provided by the appended claims.

What is claimed is:

1. A memory registration and two-level address translation and protection method implemented by a network interface card (NIC) and kernel agent forming a virtual interface provider, said method comprising the steps of:

providing a memory handle index corresponding to each region of memory registered;

maintaining a memory handle table with each entry accessed by a memory handle index and storing a memory handle;

maintaining a translation and protection table including a plurality of TPT entries, each TPT entry storing a physical address which is the translation of a virtual address utilized by a virtual interface consumer to access registered memory;

providing a first virtual address to be translated, with the first virtual address included in a first registered memory region, and also providing a first memory handle index corresponding to the first registered region;

utilizing the first memory handle to access an entry in the memory handle table holding a first memory handle;

combining the first memory handle and the first virtual address to form a pseudo-address for accessing a first entry in the TPT holding a first physical address that translates the first virtual address.

2. The method of claim 1 further comprising the steps of:

including start and extent fields in each entry of the TPT;

after generating the first pseudo-address to access the TPT:

comparing the first pseudo-address to the start field and indicating an extent violation if the magnitude of the of the start field is greater than the magnitude of the first pseudo-address;

comparing the first pseudo-address to the sum of the start and extent fields and indicating an extent violation of the magnitude of the start and extent fields is less than the magnitude of the first pseudo-address.

3. A method for defragmenting a translation protection table comprising the steps of:

providing a translation protection table (TPT), having a plurality of TPT entries, with each TPT entry holding translation data for a virtual address included in a registered memory region;

providing a memory handle table (MHT), having a plurality of MHT entries, each MHT entry associated with a registered memory region, with each MHT entry holding a memory handle, with the memory handle used in conjunction with a virtual address to access the TPT entry holding translation data for the virtual address;

providing a unique memory handle index for each memory region registered, with each unique memory handle index for accessing the entry of the memory handle table holding the memory handle for accessing TPT entries holding translation data for virtual addresses in the registered memory region;

storing translation data for each page of a first registered memory region as the content of contiguous entries of the translation protection table, with the first memory region associated with a first memory handle index;

if sufficient unused entries for storing translation data for a second memory region, associated with a second memory handle index, exist in the TPT but the entries are not contiguous:

copying contents of fragmented entries, storing translation data for the first registered memory region, to selected unused entries in the TPT, to form a contiguous region of unused TPT entries for storing translation data for the second memory region;

updating the memory handle, stored in the MHI table entry indexed by the first MHI, to access the selected TPT entries now storing translation data for the first registered memory region storing translation data for the second memory region in the contiguous region of TPT entries that previously stored translation data for the first memory region;

storing a memory handle in the entry to the MHT entry accessed by the second MHI to access the contiguous region of TPT entries holding translation data for the second memory region.

4. A system for performing address translation that utilizes a memory handle index provided to a user application, with memory handle index associated with a memory region registered by the user application, and with the memory region comprising a plurality of contiguous virtual addresses, said system comprising:

a memory handle table, having a plurality of MHT entries, with each MHT entry accessed by a unique memory handle index and holding a memory handle;

a translation and protection table (TPT), having a plurality of TPT entries, with each TPT entry accessed by a TPT pointer and holding translation data for a virtual address in a registered memory region;

pointer generating logic, responsive to a particular virtual address and a particular memory handle index provided by a user application, for combining a memory handle, accessed from the memory handle table by the particular memory handle index, with the particular virtual address to generate a particular TPT pointer that accesses translation data for the particular virtual address from the TPT.

* * * * *